United States Patent [19]

Suda

[11] Patent Number: 5,842,059
[45] Date of Patent: Nov. 24, 1998

[54] AUTOMATIC FOCUS ADJUSTING DEVICE

[75] Inventor: Hirofumi Suda, Yokohama, Japan

[73] Assignee: Canon Kabushiki Kaisha, Tokyo, Japan

[21] Appl. No.: 896,551

[22] Filed: Jul. 17, 1997

[30] Foreign Application Priority Data

Jul. 22, 1996 [JP] Japan .................................. 8-209366
Jul. 22, 1996 [JP] Japan .................................. 8-209367

[51] Int. Cl.$^6$ .................................................. G03B 13/36
[52] U.S. Cl. ........................ 396/101; 396/102; 396/135; 348/354
[58] Field of Search ..................................... 396/101, 104, 396/102, 135; 348/354, 355

[56] References Cited

U.S. PATENT DOCUMENTS 5,210,564  5/1993  Takemoto .................................. 396/101
5,341,170  8/1994  Takemoto .................................. 348/354

*Primary Examiner*—W. B. Perkey
*Attorney, Agent, or Firm*—Robin, Blecker & Daley

[57] ABSTRACT

An automatic focus adjusting device for automatically adjusting focus by using a predetermined signal component of a picked-up image signal outputted from an image sensor is arranged to find the state of an object from information on the distribution of frequencies within a DCT block and to control a focus adjusting action according to the state of the object found, so that focus adjustment can be stably performed without any erroneous operation.

25 Claims, 15 Drawing Sheets

F I G. 5
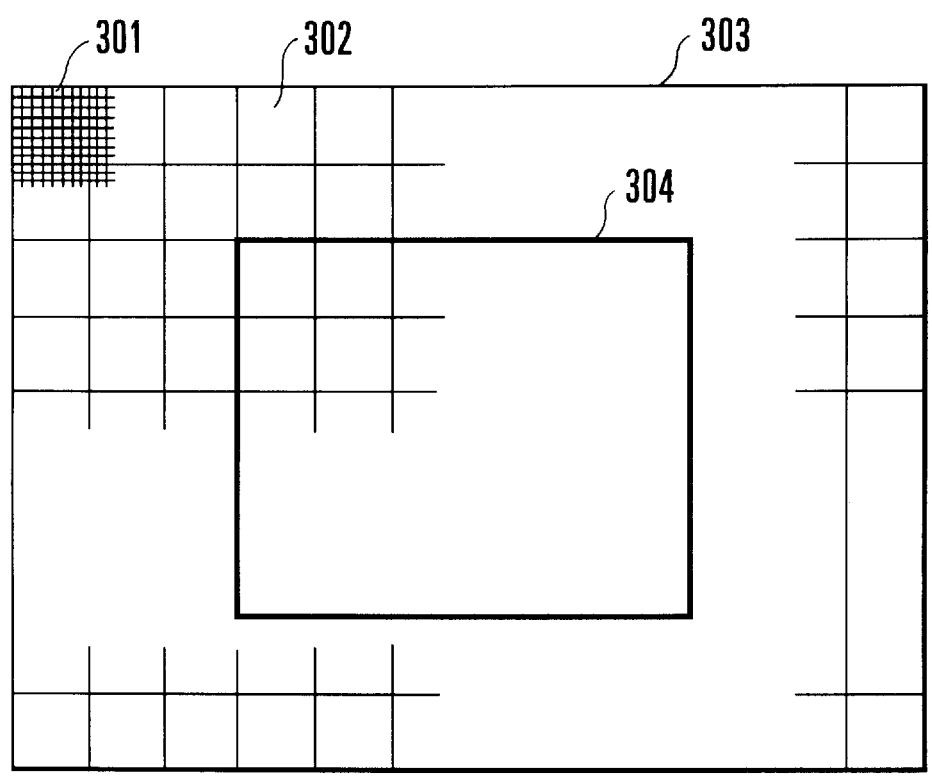

FIG.6(a)

| | LOWER FREQUENCY ← | | HORIZONTAL COMPONENT | | | HIGHER FREQUENCY → | |
|---|---|---|---|---|---|---|---|
| 11 | 12 | 13 | 14 | 15 | 16 | 17 | 18 |
| 21 | 22 | 23 | 24 | 25 | 26 | 27 | 28 |
| 31 | 32 | 33 | 34 | 35 | 36 | 37 | 38 |
| 41 | 42 | 43 | 44 | 45 | 46 | 47 | 48 |
| 51 | 52 | 53 | 54 | 55 | 56 | 57 | 58 |
| 61 | 62 | 63 | 64 | 65 | 66 | 67 | 68 |
| 71 | 72 | 73 | 74 | 75 | 76 | 77 | 78 |
| 81 | 82 | 83 | 84 | 85 | 86 | 87 | 88 |

(Vertical axis: LOWER FREQUENCY → HIGHER FREQUENCY, VERTICAL COMPONENT)

FIG.6(b)

| | LOWER FREQUENCY ← | | HORIZONTAL COMPONENT | | | HIGHER FREQUENCY → | |
|---|---|---|---|---|---|---|---|
| a1 | b1 | c1 | d1 | e1 | f1 | g1 | h1 |
| b3 | b2 | c2 | d2 | e2 | f2 | g2 | h2 |
| c5 | c4 | c3 | d3 | e3 | f3 | g3 | h3 |
| d7 | d6 | d5 | d4 | e4 | f4 | g4 | h4 |
| e9 | e8 | e7 | e6 | e5 | f5 | g5 | h5 |
| f11 | f10 | f9 | f8 | f7 | f6 | g6 | h6 |
| g13 | g12 | g11 | g10 | g9 | g8 | g7 | h7 |
| h15 | h14 | h13 | h12 | h11 | h10 | h9 | h8 |

(Vertical axis: LOWER FREQUENCY → HIGHER FREQUENCY, VERTICAL COMPONENT)

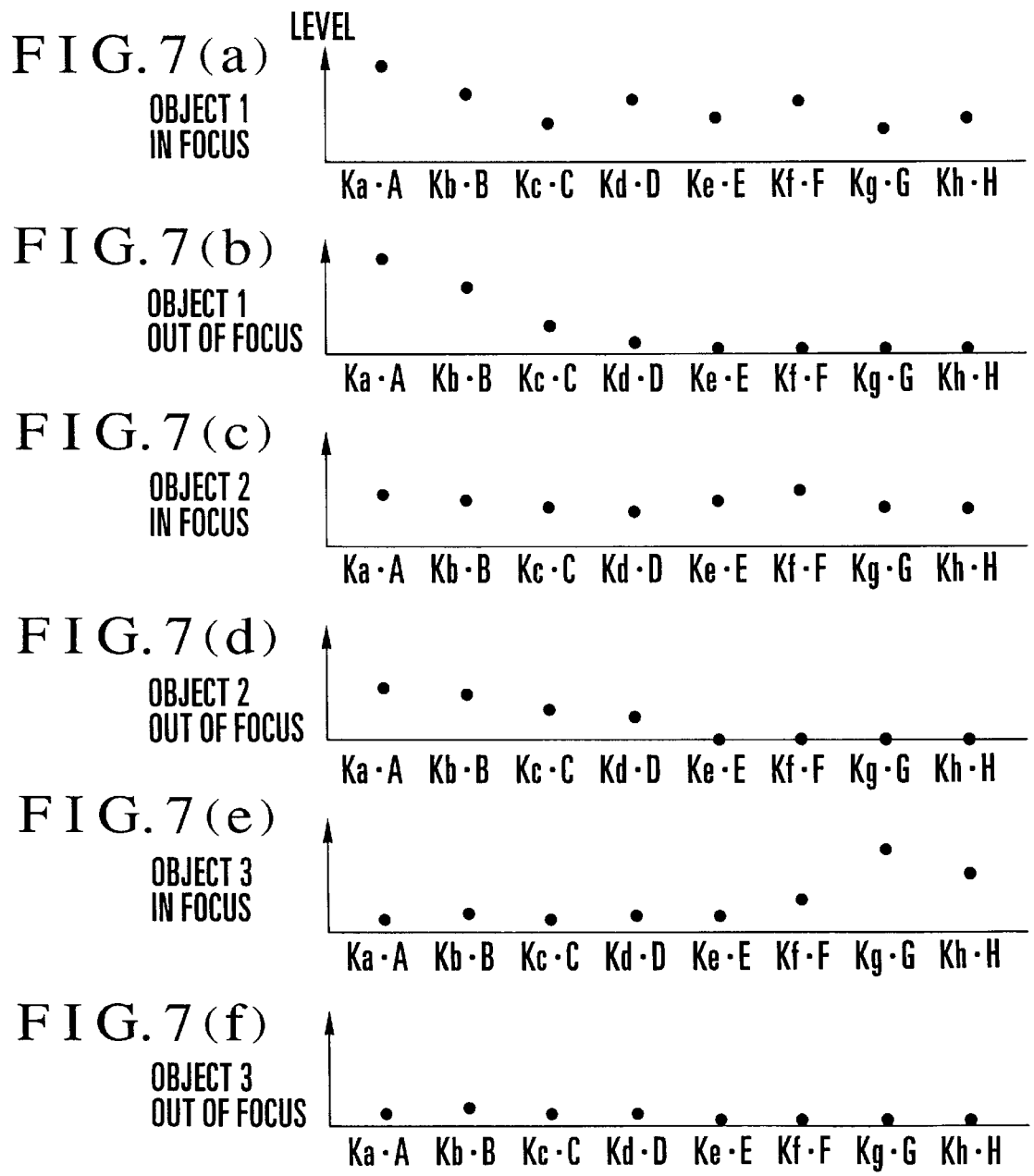

AUTOMATIC FOCUS ADJUSTING DEVICE

BACKGROUND OF THE INVENTION

1. Field of the Invention

The present invention relates to an automatic focus adjusting device and an automatic focus adjusting method adapted for use in a video camera or an electronic still camera.

2. Description of Related Art

Automatic focus adjusting methods which have heretofore been employed for video apparatuses such as video cameras or the like include a method called a hill-climbing method. According to the hill-climbing method, focus is adjusted by extracting a high-frequency component from a video signal obtained by an image sensor which is composed of a CCD or the like and by driving a photo-taking lens in such a way as to cause the high-frequency component to take a maximum value.

Such an automatic focus adjusting method obviates the necessity of any optical member specially arranged for focus adjustment and yet permits accurate focusing irrespective of the distances of shooting objects. FIG. 1 shows in a block diagram the arrangement of a conventional automatic focus adjusting device.

Referring to FIG. 1, light coming from an object of shooting passes through a fixed first lens group 101a, a second lens group 102a which performs a magnification varying action (hereinafter referred to as a variator lens), an iris 103a, a fixed third lens group 104a and a fourth lens group 105a (hereinafter referred to as a focusing lens). The focusing lens 105a has a compensating function for compensating any shift of a focal plane caused by the magnification varying action as well as a focus adjusting function. The light of the object passing through the above lens groups is imaged on an image sensor 106a.

The focusing lens 105a is arranged to be moved in an optical axis direction by a focus motor 115a to perform focus adjustment. The variator lens 102a is arranged to be moved in optical axis direction by a zoom motor 117a to perform the magnification varying action whereby the focal length of the optical system is varied. The image sensor 106a photo-electrically converts an object image formed on its image pickup plane into an electrical signal and outputs the electrical signal as a video signal.

The video signal is sampled and held by a correlated double sampling circuit (CDS) 107a. The video signal is then amplified to a predetermined level by an automatic gain control circuit (AGC) 108a and is converted into digital video data by an A/D converter 109a. After that, the digital video data is supplied to a camera signal processing circuit to be converted into a standard TV signal. The digital video data is also supplied to a band-pass filter (BPF) 110a.

The BPF 110a extracts a high-frequency component from the video signal. The extracted high-frequency component is then supplied to an absolute value converting (ABS) circuit 111a to be converted into a signal which is completely of positive polarity. The signal thus processed is supplied to a detection circuit 112a. The detection circuit 112a rectifies, by peak holding and integrating, only a part of the input signal corresponding to a focus detecting area set within an image plane as indicated by an output of a gate signal generator 119a. The detection circuit 112a is thus arranged to form an AF evaluation value at intervals synchronized with a period which is an integer times as much as the period of a vertical synchronizing signal.

The AF (automatic focusing) evaluation value is supplied to a microcomputer 901. The microcomputer 901 then decides a focusing speed according to the degree of focus indicated by the AF evaluation value and also decides a motor driving direction in such a manner that the AF evaluation value increases. The focus motor driver 114a is instructed to drive the focus motor 115a to rotate at the speed and in the direction thus decided by the microcomputer 901. The focusing lens 105a is thus moved by the focus motor 115a in the optical axis direction so as to perform focus adjustment.

FIG. 2 is a flow chart showing the procedures of an automatic focusing operation to be executed by the microcomputer 901. The microcomputer 901 takes in the AF evaluation values at the intervals synchronized with the period which is integer times as much as the vertical synchronizing signal. An AF control loop is then carried on by repeating the following flow of operation.

At a step S201 in FIG. 2, a power supply is switched on to start the AF operation. At a step S202, control by the hill-climbing method is performed. The focusing lens is driven in such a way as to cause the AF evaluation value to always increase by controlling the driving speed and direction according to the level of the AF evaluation value, etc. At a step S203, upon completion of one round of the hill-climbing control, the arrival at the top of a hill is decided by moving the position of the focusing lens backward after overshooting a hilltop. The focusing lens is then brought to a stop at a point where the highest level of the AF evaluation value is obtained. At a step S204, the flow waits for a restart of the AF operation. When the level of the AF evaluation value is found to have become lower, the flow comes to a step 205 to restart the AF operation from the step S202.

However, the AF operation of the conventional automatic focus adjusting device depends solely on the increase or decrease of the AF evaluation value in spite of the fact that the level of an in-focus state and that of an out-of-focus (defocus) state vary with the object. Therefore, depending on the object, the microcomputer has sometimes made a misjudgment to cause the AF operation to erroneously come to a stop in an out-of-focus state, to excessively overshoot an in-focus point or to require an unnecessarily long time before coming to an in-focus state due to a slow motor speed. This problem is serious particularly in the event of a low-contrast object and a low-illuminance object. Either of such objects gives such a small output that is hardly recognizable, thereby making control apposite to its characteristic extremely difficult.

BRIEF SUMMARY OF THE INVENTION

It is a first object of the invention to provide an automatic focus adjusting device and an automatic focus adjusting method by which an automatic focusing (AF) operation can be stably and accurately carried out without making any misjudgment due to the state of the object and shooting conditions.

It is a second object of the invention to provide an automatic focus adjusting device adapted for a video camera or the like arranged to perform a digital signal processing action.

It is a third object of the invention to provide an automatic focus adjusting device adapted for a video camera or the like having image compressing means.

To attain the above objects, in accordance with an aspect of the invention, there is provided an automatic focus adjusting device arranged to adjust, by driving a focusing lens, focus of an image picked up by image pickup means, which comprises extracting means for extracting, as a focus signal, a high-frequency component in a focus detecting area within an image plane of the image picked up by the image pickup means, object frequency recognizing means for recognizing, from a frequency distribution of an object whose image is picked up by the image pickup means, a feature of the object, and driving means for driving the focusing lens on the basis of the focus signal extracted by the extracting means and the feature of the object recognized by the object frequency recognizing means.

In accordance with another aspect of the invention, there is provided an automatic focus adjusting device which comprises extracting means for extracting, as a focus signal, a high-frequency component in a focus detecting area within an image plane of an image picked up by image pickup means, driving means for driving a focusing lens on the basis of the extracted focus signal so as to adjust focus of the image picked up by the image pickup means, two-dimensional transforming means for transforming into frequency components a two-dimensional image of an object whose image is picked up by the image pickup means, recognizing means for recognizing a feature of the object by comparing a magnitude of each of the frequency components with a predetermined value, and varying means for varying characteristics of the extracting means and the driving means on the basis of a result of recognition provided by the recognizing means.

In accordance with a further aspect of the invention, there is provided an automatic focus adjusting device which comprises extracting means for extracting, as a focus signal, a high-frequency component in a focus detecting area within an image plane of an image picked up by image pickup means, driving means for driving a focusing lens on the basis of the extracted focus signal so as to adjust focus of the image picked up by the image pickup means, two-dimensional transforming means for transforming into frequency components a two-dimensional image of an object whose image is picked up by the image pickup means, determining means for determining whether a magnitude of time fluctuation of each of the frequency components is greater than a predetermined value, and varying means for varying characteristics of the extracting means and the driving means on the basis of a result of determination provided by the determining means.

These and other objects and features of the invention will become apparent from the following detailed description of embodiments thereof taken in connection with the accompanying drawings.

BRIEF DESCRIPTION OF THE SEVERAL VIEWS OF THE DRAWING

FIG. 5 shows how the picture elements of one frame are divided.

FIGS. 6(a) and 6(b) show frequency area data obtained by a two-dimensional discrete cosine transform (DCT) action of a two-dimensional DCT unit 202 shown in FIG. 4.

FIGS. 7(a) to 7(f) show pattern data prestored in a pattern memory 206 shown in FIG. 4.

DETAILED DESCRIPTION OF THE INVENTION

The following describes, with reference to the drawings, automatic focus adjusting devices arranged as preferred embodiments of the invention.

(First Embodiment)

Figure 3:
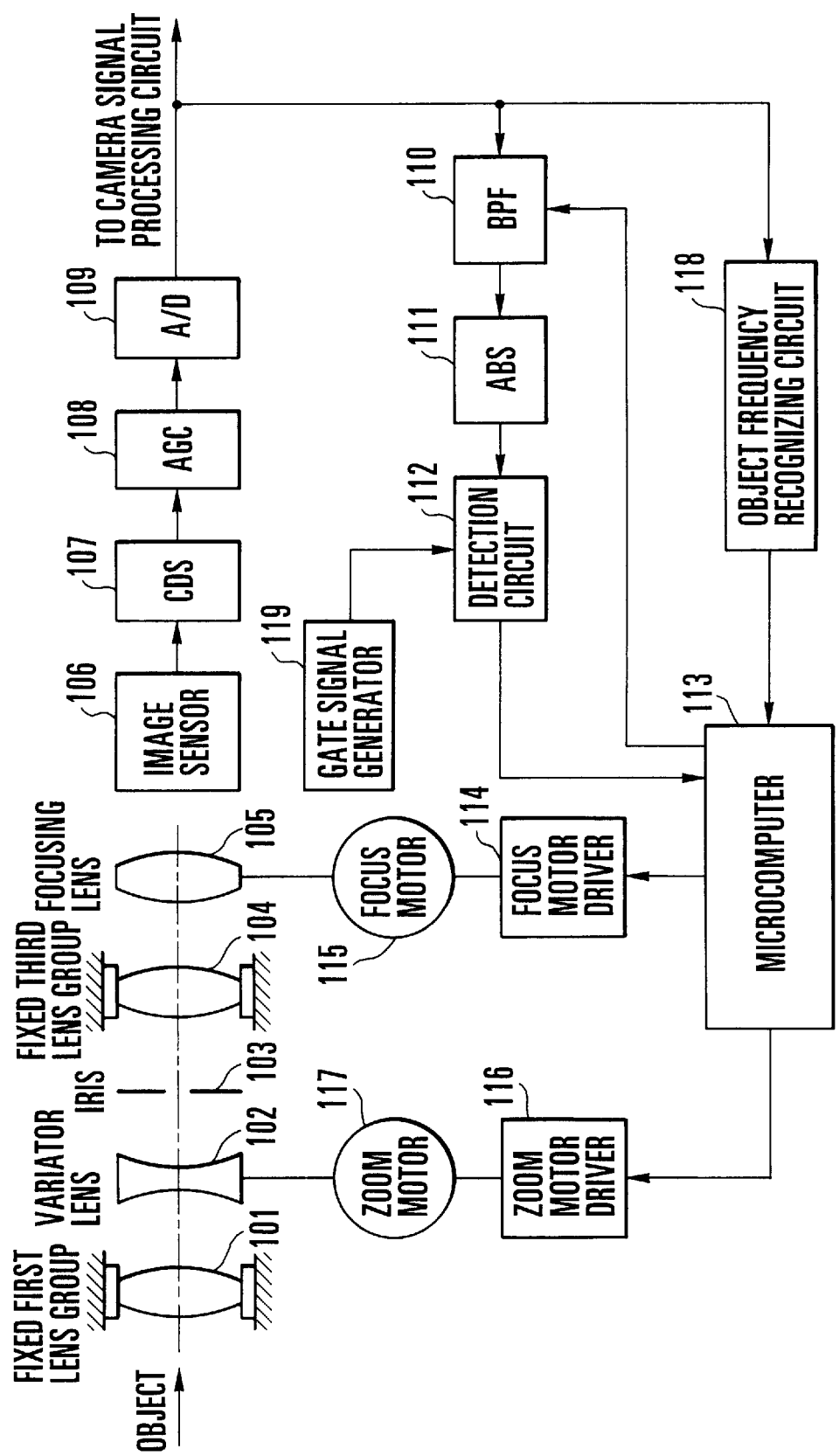
FIG. 3 is a block diagram showing the arrangement of an automatic focus adjusting device according to the invention as a first embodiment thereof.

FIG. 3 shows in a block diagram the arrangement of an automatic focus adjusting device arranged as a first embodiment of the invention. Light coming from an object of shooting passes through a fixed first lens group 101, a second lens group 102 (hereinafter referred to as a variator lens) arranged to perform a magnification varying action, an iris 103, a fixed third lens group 104 and a fourth lens group 105 (hereinafter referred to as a focusing lens) which has a compensating function to correct a shift of a focal plane caused by the magnification varying action as well as a focus adjusting function. The object light passing through the above lens groups is imaged on an image sensor 106.

The focusing lens 105 is arranged to perform a focusing action by being moved in the optical axis direction by a focus motor 115. The variator lens 102 is arranged to perform a magnification varying action by being moved in the optical axis direction by a zoom motor 117 in such a way as to vary the focal length of the lens system. The image of the object formed on the image pickup plane of the image sensor 106 is converted into an electrical signal and is outputted from the image sensor 106 as a video signal.

The video signal is sampled and held by a CDS (correlated double sampling) circuit 107 and is supplied to an automatic gain control circuit (AGC) 108 to be amplified to a predetermined level. The amplified video signal is supplied to an A/D converter 109 to be A/D-converted into digital video data. The digital video data is supplied to a camera signal processing circuit to be converted into a standard TV signal. The digital video data is, at the same time, supplied also to a band-pass filter (BPF) 110.

The BPF 110 extracts, from the digital video data, a high-frequency component which varies according to the state of focus. The high-frequency component extracted is supplied to an absolute value converting (ABS) circuit 111 to be converted into a signal which is completely of positive polarity. The signal thus processed is supplied to a detection circuit 112. The detection circuit 112 rectifies, by peak holding and integrating, only a part of the input signal corresponding to a focus detecting area set within an image plane as indicated by an output of a gate signal generator 119. The detection circuit 112 is thus arranged to form an AF evaluation value at intervals synchronized with a period which is an integer times as much as the period of a vertical synchronizing signal.

The AF (automatic focusing) evaluation value is supplied to a microcomputer 113. The microcomputer 113 then decides a focusing speed according to the degree of focus indicated by the AF evaluation value and also decides a motor driving direction in such a manner that the AF evaluation value increases. The focus motor driver 114 is instructed to drive the focus motor 115 to rotate at the speed and in the direction thus decided by the microcomputer 113. The focusing lens 105 is thus moved by the focus motor 115 in the optical axis direction so as to perform focus adjustment.

Figure 4:
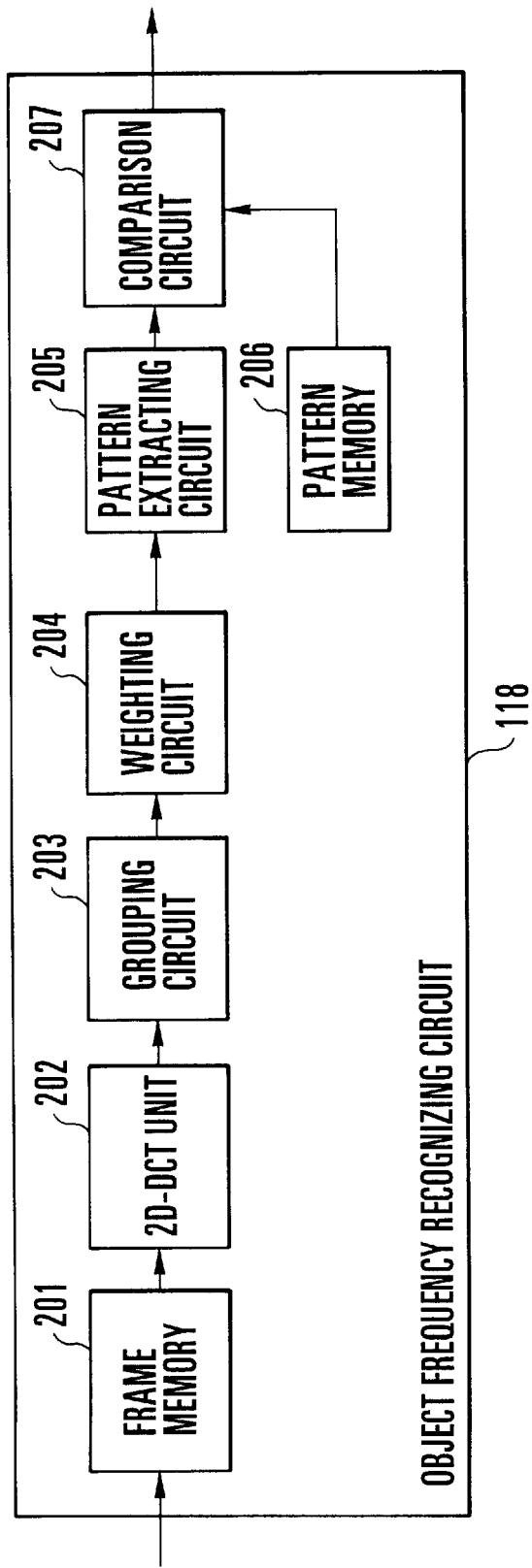
FIG. 4 is a block diagram showing the arrangement of an object frequency recognizing circuit 118 included in the arrangement shown in FIG. 3.

An object frequency recognizing circuit 118 is arranged to have the digital video data inputted from the A/D converter 109, to perform a recognizing action on the digital video data and to supply the result of recognition to the microcomputer 113. FIG. 4 is a block diagram showing in detail the arrangement of the object frequency recognizing circuit 118. As shown in FIG. 4, the object frequency recognizing circuit 118 is composed of a frame memory 201, a two-dimensional DCT unit 202, a grouping circuit 203, a weighting circuit 204, a pattern extracting circuit 205, a pattern memory 206 and a comparison circuit 207.

The digital video data is stored by the frame memory 201 in units of one frame. Within each frame of the digital video data, each block consisting of 8×8 picture elements in the horizontal and vertical directions is converted into frequency area data by a two-dimensional discrete cosine transform (hereinafter referred to as a 2D-DCT) process of the two-dimensional DCT unit 202 at a time.

The grouping circuit 203 divides the frequency area data into groups "a" to "h" by frequency bands in such a way as to have the frequency area data of about the same frequency band in one and the same group. The largest data in each group is considered to be a representative value of that group. The groups "a" to "h" are thus assumed to have representative values A to H, respectively.

The weighting circuit 204 is arranged to attach some weight to the representative values by multiplying the representative values A to H respectively by weighting coefficients Ka to Kh. The weighting coefficients Ka to Kh are set in such a way as to bring the representative values of all the groups up to about the same level when a signal of a fixed level evenly having frequency bands from a low band through a high band are inputted.

The pattern extracting circuit 205 is arranged to extract a pattern indicating changes in level of the weighted representative values Ka·A to Kh·H and also differences in magnitude of them. The comparison circuit 207 is arranged to compare the extracted pattern with pattern data prestored in the pattern memory 206, so that it is possible to recognize what kind of an object image is represented by the 8×8 picture elements and whether the image is in focus or not.

FIG. 5 shows how picture elements for one frame are divided. In FIG. 5, reference numeral 303 denotes one frame of the image plane. Reference numeral 301 denotes one picture element. Reference numeral 302 denotes each divided block consisting of the 8×8 picture elements. Reference numeral 304 denotes a focus detecting area which is set within the image plane and is indicated by the output of the gate signal generator 119.

FIGS. 6(a) and 6(b) show the frequency area data obtained through a two-dimensional DCT action carried out by the two-dimensional DCT unit 202. In FIG. 6(a), the horizontal components of the data are shown in the lateral direction and the vertical components of the data are shown in the vertical direction. The frequency becomes higher accordingly as the component is located closer to the right and lower ends in the graph of FIG. 6(a). In FIG. 6(a), a value "11" approximately represents a direct-current component. FIG. 6(b) shows how these data components are grouped. Each of data a1, data b1 to b3, data c1 to c5, data d1 to d7, data e1 to e9, data f1 to f11, data g1 to g13 and data h1 to h15 are of about the same frequency band and are, therefore, classified as one and the same group. The data of the largest value within each of these groups are handled as a representative value. The representative values thus obtained are expressed as representative values A, B, C, D, E, F, G and H.

The weighting circuit 204 attaches weight to the representative values A to H of the frequency area data by multiplying them by suitable coefficients Ka to Kh. FIGS. 7(a) to 7(f) show pattern data prestored in the pattern memory 206. In FIG. 7(a), the pattern data indicates an ordinary object (object 1) which is in an in-focus state. In this case, there exist all the frequency components from a low band through a high band.

In FIG. 7(b), the pattern data indicates an ordinary object (object 1) which is in an out-of-focus state. In this case, the pattern data shows a characteristic which appears as if it is obtained by mixing a low-pass characteristic of the lens optical system with the frequency characteristic shown in FIG. 7(a). Although the data is in the same state as the in-focus state of FIG. 7(a) in low-frequency bands, there is no high-frequency band components.

In FIG. 7(c), the pattern data indicates a low-contrast object (object 2) which is in an in-focus state. Although the data of FIG. 7(c) includes all the frequency components from a low band through a high band, its level is low as a whole.

In FIG. 7(d), the pattern data indicates a low-contrast object (object 2) which is in an out-of-focus state. The data indicates a frequency distribution in which there is no high-frequency band components shown in FIG. 7(c).

In FIG. 7(e), the pattern data indicates a fine object (object 3) which is in an in-focus state. The data of FIG. 7(e) indicates that a small amount of low-frequency band components and a large amount of high-frequency band components.

In FIG. 7(f), the pattern data indicates a fine object (object 3) which is in an out-of-focus state. The data of FIG. 7(f) indicates a frequency distribution in which there is no high-frequency band components shown in FIG. 7(e).

Figure 8:
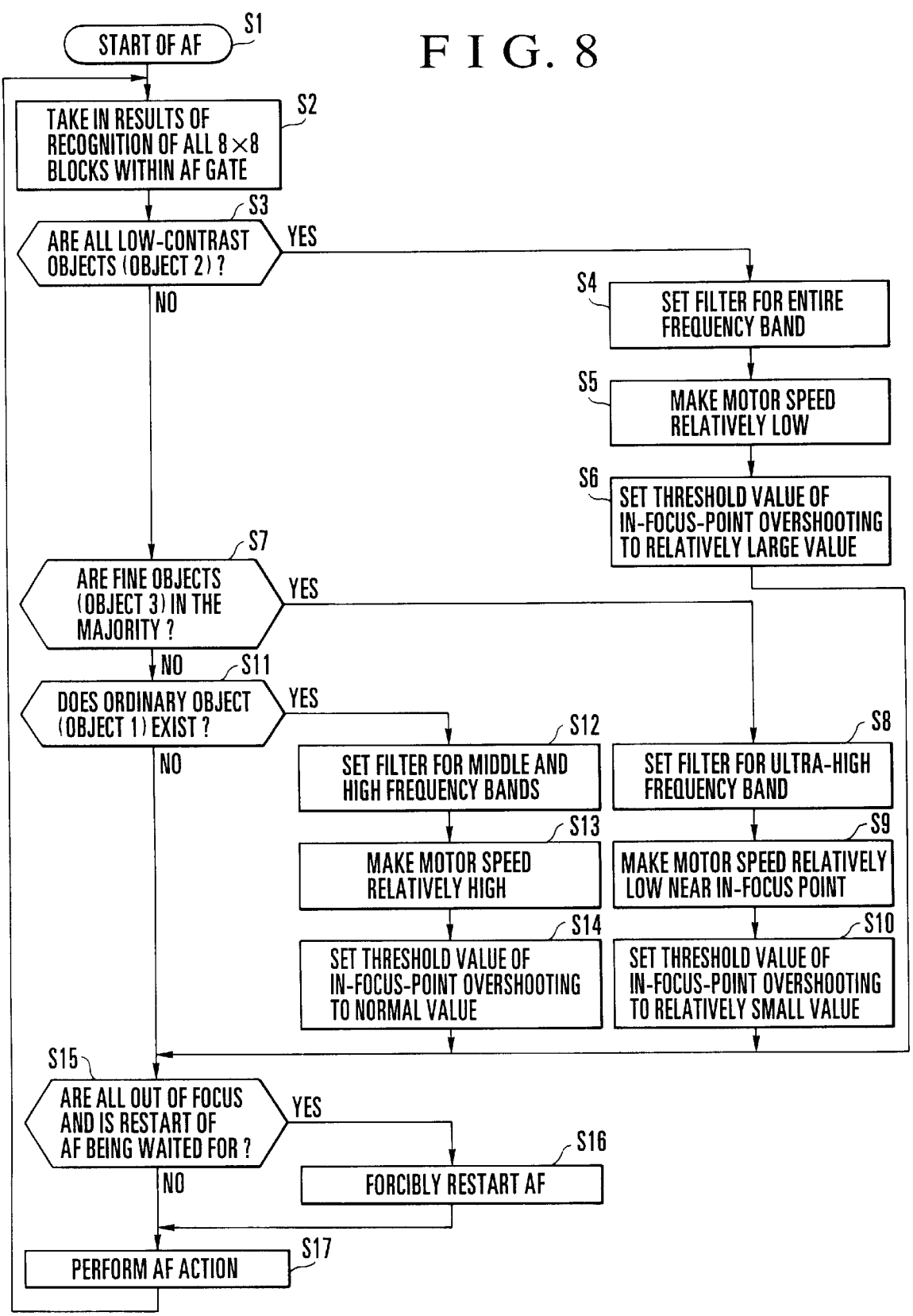
FIG. 8 is a flow chart showing the procedures of focus adjustment to be taken by a microcomputer 113 shown in FIG. 3 on the basis of the results of an object frequency recognizing action.

FIG. 8 is a flow chart showing procedures for focus adjustment to be executed by the microcomputer 113 on the basis of the results of recognition of the object frequencies. At a step S1, the automatic focus adjusting device is initialized and the microcomputer 113 starts operating either when a power supply is switched on or when the AF function is turned on. At a step S2, the results of the recognizing action on the frequencies of all the blocks of 8×8 picture elements within the focus detecting area (AF gate) are completely taken in the memory included in the microcomputer 113. At a step S3, the results of recognizing action taken in are checked to find if all the results indicate low-contrast objects (object 2) irrespective of their states of focus. If so, the flow of operation proceeds to a step S4.

At the step S4, the characteristic of the BPF 110 is set for the entire frequency band. At a step S5, the speed of the motor is set at a speed slower than a normal speed. At a step S6, the threshold value of overshooting an in-focus point is set at a somewhat larger value than a normal overshooting threshold value.

If it is found at the step S3 that not all the results of the recognizing action indicate low-contrast objects, on the other hand, the flow proceeds to a step S7. At the step S7, the results are checked to find if fine objects (object 3) are in the majority irrespective of their states of focus. If so, the flow proceeds to a step S8. At the step S8, the characteristic of the BPF 110 is set for an ultra-high-frequency band. At a step S9, the motor speed to be used in the neighborhood of an in-focus point is set at a somewhat lower speed than the normal speed. At a step S10, the threshold value of overshooting an in-focus point is set at a somewhat smaller value than the normal value for the purpose of making the overshooting less conspicuous.

Further, if fine objects are found at the step S7 to be not in the majority, the flow proceeds to a step S11. At the step S11, the results of the recognizing action are checked to find if there is any ordinary object within the focus detecting area irrespective of its state of focus. If so, the flow proceeds to a step S12. At the step S12, the characteristic of the BPF 110 is set for middle and high frequency bands. At a step S13, the motor speed is set at a somewhat faster speed than the normal speed. At a step S14, the threshold value of overshooting an in-focus point is set at the normal value.

In cases where the results of the recognizing action taken in do not apply to any of the conditions provided at the steps S3, S7 and S11, nothing is changed, and the flow of operation proceeds to a step S15. At the step S15, the results of the recognizing action taken in are checked to find if all the data indicate an out-of-focus state and that the automatic focusing action is waiting for a restart. If so, this condition can be assumed to indicate that the AF (automatic focusing) action has erroneously come to a stop leaving the focusing lens in an out-of-focus position, and the flow proceeds to a step S16. At the step S16, the AF action is forcibly restarted. In this case, a threshold value which is to be used for detecting a restart of the AF action may be variably set.

If all the data is found at the step S15 to indicate an out-of-focus state and the AF action is not waiting for a restart, the flow proceeds to a step S17.

At the step S17, the automatic focusing action is performed according to the hill-climbing method in the same manner as in the conventional device. The flow then returns to the step S2 to repeat the above-stated loop, which is executed in synchronism with a period an integer times as long as the period of a vertical synchronizing signal.

While the first embodiment is arranged to perform the object frequency recognizing action only within the focus detecting area, the arrangement may be changed to perform the action not only within the focus detecting area but also for the whole frame area. The arrangement also may be changed to perform the recognizing action by taking a block of picture elements larger or smaller than the block of 8×8 picture elements as the unit of the recognizing action. Further, the grouping circuit 203 is arranged to use the largest value of each group as a representative value. However, that arrangement may be changed to use a sum of values obtained within each group as the representative value.

The performance of the automatic focus adjusting device can be enhanced by increasing the amount of the object pattern data prestored and by increasing the number of conditional branching parts accordingly within the microcomputer 113.

The object frequency recognizing circuit 118 is arranged to recognize the object frequencies after image data for one frame is stored by the frame memory 201. However, since automatic focus adjustment must be carried out at a high speed, the object frequency recognizing circuit 118 may be arranged, in the case of an interlaced-scanning type camera, to store just image data for one field at a field memory and to perform the object frequency recognizing action on a field image thus obtained.

(Second Embodiment)

An automatic focus adjusting device according to a second embodiment of the invention is described below. The arrangement of the automatic focus adjusting device according to the second embodiment differs from that of the first embodiment only in respect of an object frequency recognizing circuit. Therefore, the details of other component parts of the second embodiment are omitted in the following description.

Figure 9:
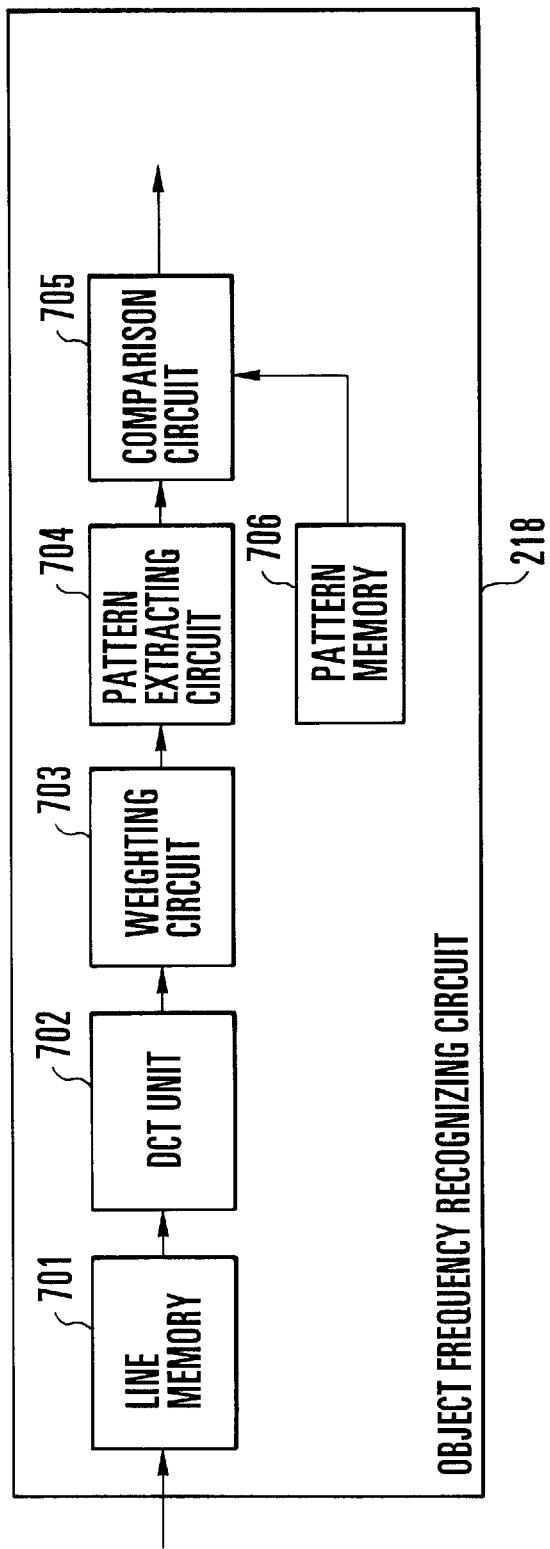
FIG. 9 is a block diagram showing the arrangement of an object frequency recognizing circuit in an automatic focus adjusting device according to the invention as a second embodiment thereof.

FIG. 9 is a block diagram showing the arrangement of the object frequency recognizing circuit 218 in the second embodiment. The object frequency recognizing circuit 218 is composed of a line memory 701, a DCT unit 702, a weighting circuit 703, a pattern extracting circuit 704, a pattern memory 706 and a comparison circuit 705.

Figure 10:
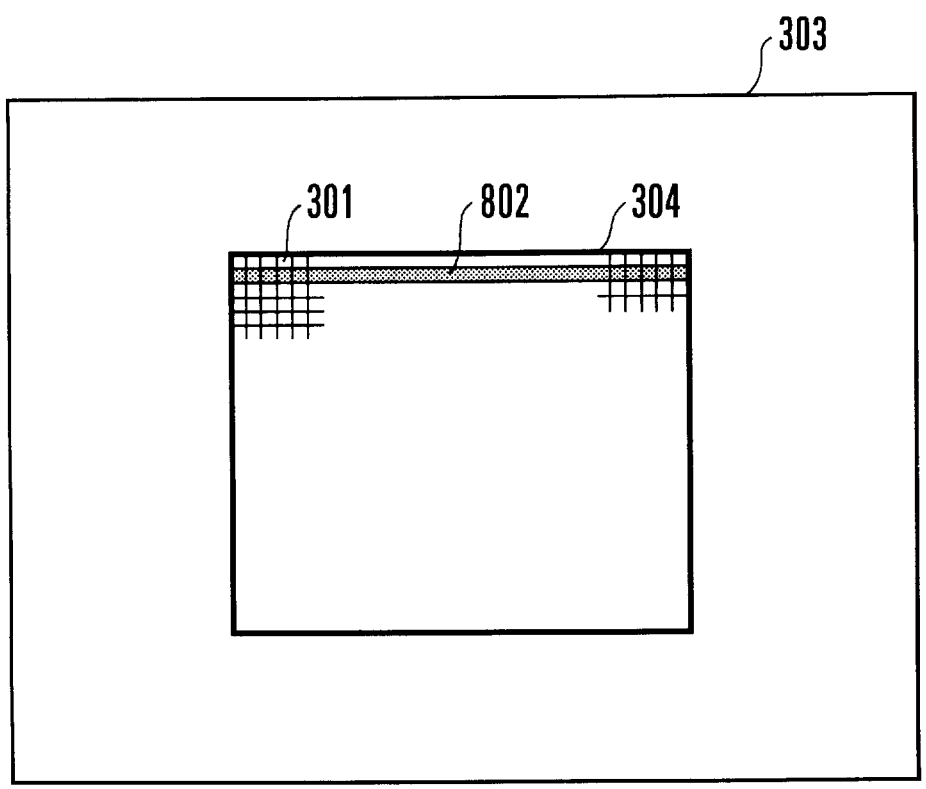
FIG. 10 shows data in the horizontal line direction.

The block arrangement of the second embodiment is identical with that of the first embodiment. However, in the case of the second embodiment, the recognizing action on the object frequencies is performed not for every square block of 8×8 picture elements but for every horizontal line of picture elements. FIG. 10 shows data aligned in the direction of horizontal lines.

The object frequency recognizing circuit 218 in the second embodiment can be arranged at a relatively low cost by virtue of the use of data 802 one-dimensionally aligned in the horizontal direction for recognizing the frequencies of the object. The digital video data is stored in units of one line by the line memory 701. Among picture elements of the image plane, the picture elements located within the focus detecting area are serially converted into DCT frequency area data (A to X) by the DCT unit 702.

The weighting circuit 703 attaches weight to each of the converted data in such a way as to optimize it by multiplying these data by coefficients K' to K'x. The weighting coefficients are set at such values that the levels of data of the entire frequency band become about the same when a signal in which frequencies are uniformly distributed from a low-frequency band through a high-frequency band is inputted.

The pattern extracting circuit 704 is arranged to extract a pattern indicating changes in level of the weighted data values $K'a \cdot A$ to $K'x \cdot X$ and indicating differences in magnitude of them. The comparison circuit 705 is arranged to compare the extracted pattern with pattern data prestored in the pattern memory 706, so that it is possible to recognize what kind of an object image is obtained in the line image and whether the image is in focus or not. The microcomputer 113 is arranged to control the automatic focus adjustment according to the same algorithm as in the case of the first embodiment described above.

In each of the first and second embodiments, the DCT unit which is one of orthogonal transforming means is used for transformation of frequency areas. The DCT unit, however, may be replaced with some other known orthogonal transforming means, such as a discrete Fourier transform (DFT) unit or a fast Fourier transform (FFT) unit.

The invention is applicable either to a system composed of a plurality of apparatuses or to a system composed of a single apparatus. The invention is also applicable to a case where automatic focus adjustment can be accomplished by supplying a program to a system or an apparatus. In that case, the advantageous effect of the invention can be attained by storing a program expressed in software in a storage medium and by reading the program from the storage for the system or the apparatus.

For adjusting a focused state of an image picked up by image pickup means by driving a focusing lens, the embodiment is arranged as described above to extract as a focus signal a high-frequency component in a focus detecting area within the image pickup plane of the image pickup means by extracting means, to recognize and find a feature of an object from the frequency distribution of the object image picked up by the image pickup means, and to drive the focusing lens by driving means on the basis of the feature recognized or found by the object frequency recognizing means. Since the automatic focus adjustment is made on the basis of both a focus signal obtained by extracting the high-frequency component in the focus detecting area and the feature in the frequency distribution of the object image obtained as a result of recognizing action, a focusing action can be stably and accurately carried out without any misjudgment due to a misleading state of the object or shooting conditions.

Further, in adjusting the focused state of an object of shooting by extracting with the extracting means a high-frequency component in a focus detecting area within the image pickup plane of the image pickup means, as a focus signal, and by driving with the driving means the focusing lens on the basis of the focus signal extracted, the embodiment is arranged to transform a two-dimensional image of the object picked up by the image pickup means into frequency components by two-dimensional transforming means, to recognize and find, by recognizing means, a feature of the object by comparing the magnitude of each of the frequency components thus obtained with a predetermined value, and to vary by varying means the characteristic of the extracting means and that of the driving means on the basis of the result of recognition. The feature of the object image is thus found by comparing the results of transformation (or conversion) into the two-dimensional frequency area with prestored information, and various characteristics of the automatic focusing action are varied according to the results of comparison. The arrangement of the embodiment described effectively lessens such shooting objects that have been very difficult for automatic focus adjustment.

The two-dimensional transforming (converting) means is arranged to include storing means for temporary storage of the two-dimensional image, two-dimensional orthogonal transforming means for orthogonally transforming the two-dimensional image stored, and grouping means by which the frequency components orthogonally transformed are classified into groups of different frequency bands. The arrangement effectively simplifies the processes of the device by permitting use of the results of processes on each of grouped areas.

Further, the two-dimensional transforming means is arranged to perform a two-dimensional discrete cosine transforming action. That arrangement enables the device to readily carry out the transforming process by using a microcomputer. The two-dimensional transforming means is also arranged to perform the two-dimensional discrete cosine transforming action on each of divided blocks of picture elements obtained by dividing the above-stated two-dimensional image into 8 (horizontal) ×8 (vertical) picture elements. Therefore, the period of time required for the transforming action can be shortened by setting each of the picture element blocks in a suitable size.

According to the arrangement for varying the characteristic of the above-stated extracting means, a focusing action can be stably performed irrespective of the state of the object and the shooting conditions.

According to the arrangement for varying the driving speed of the above-stated driving means, a focusing action also can be stably performed irrespective of the state of the object and the shooting conditions.

The above-stated varying means is arranged to vary the overshooting threshold value to be used in detecting an in-focus point. The arrangement enables the embodiment to stably perform focusing irrespective of the state of the object and the shooting conditions.

The varying means is also arranged to vary a threshold value to be used in detecting a restart of the AF action. That arrangement also enables the embodiment to stably carry out a focusing action irrespective of the state of object and the shooting conditions.

According to the arrangement of the embodiment described, a high-frequency component in the focus detecting area within the image pickup plane of the image pickup means is extracted as a focus signal, in adjusting the focused state of an image picked up by the image pickup means by driving the focusing lens with the driving means on the basis of the extracted focus signal, the object image picked up by the image pickup means is converted or transformed into frequency components for every line by the transforming means, a feature of the object is recognized or found by the recognizing means by comparing the magnitude of each of the frequency components obtained by the transforming means with a predetermined value, the characteristic of the extracting means and that of the driving means are varied by the varying means on the basis of the result of the recognizing action. Therefore, with the image orthogonally transformed into frequency areas for every horizontal line and the results of the transforming action compared with prestored information, the circuits of the embodiment can be arranged at a low cost.

(Third Embodiment)

Next, a third embodiment of the invention is described as follows.

The third embodiment of the invention is arranged to control an automatic focus adjusting action on the basis of fluctuations with time in each of the frequency components of an image signal.

Figure 11:
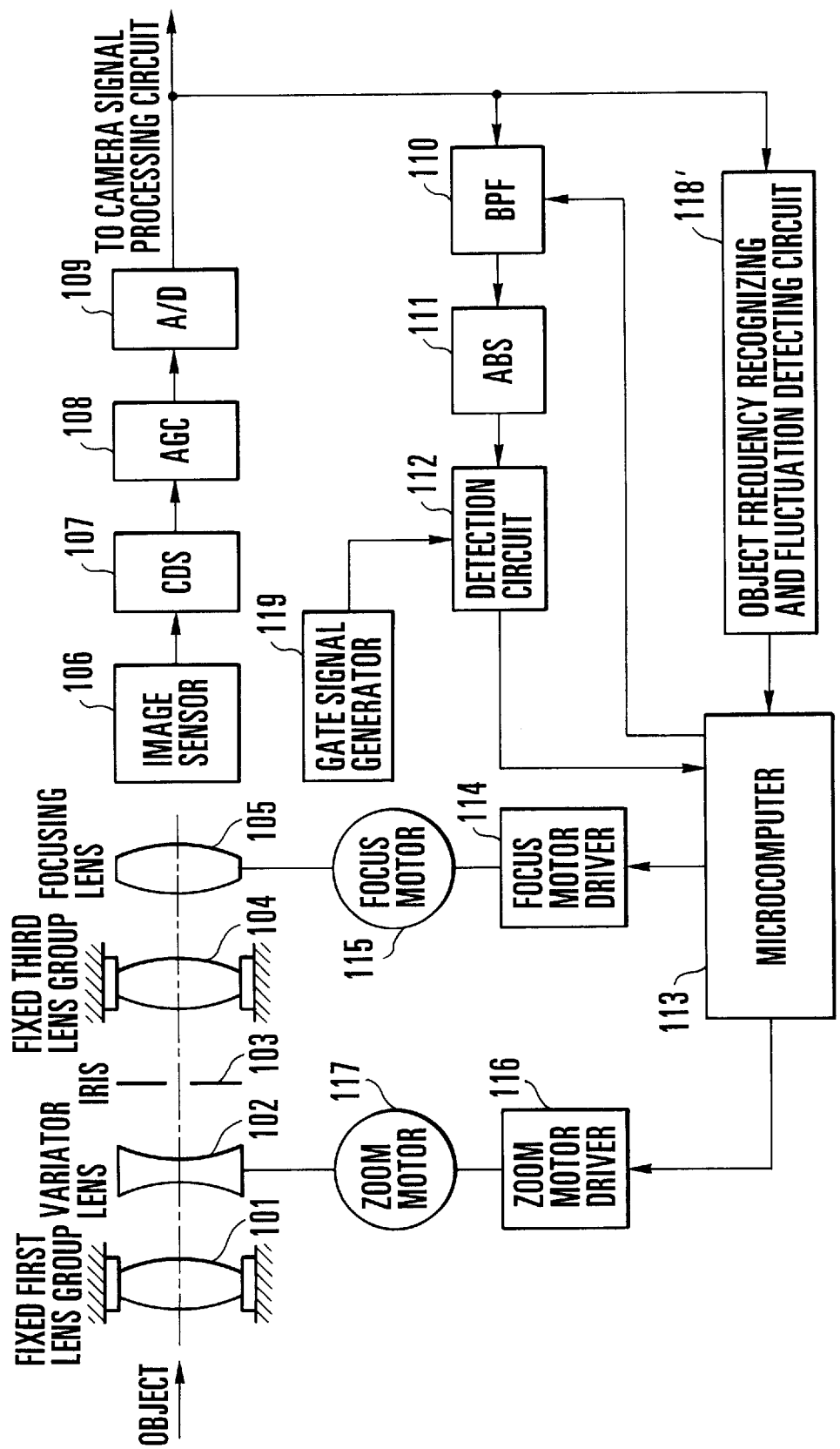
FIG. 11 is a block diagram showing the arrangement of an automatic focus adjusting device according to the invention as a third embodiment thereof.

FIG. 11 shows in a block diagram the arrangement of an automatic focus adjusting device according to the third embodiment of the invention. In FIG. 11, all component parts that are arranged in the same manner as the parts of the first embodiment shown in FIG. 3 are indicated by the same reference numerals, and the details of them are omitted from the following description.

Figure 1:
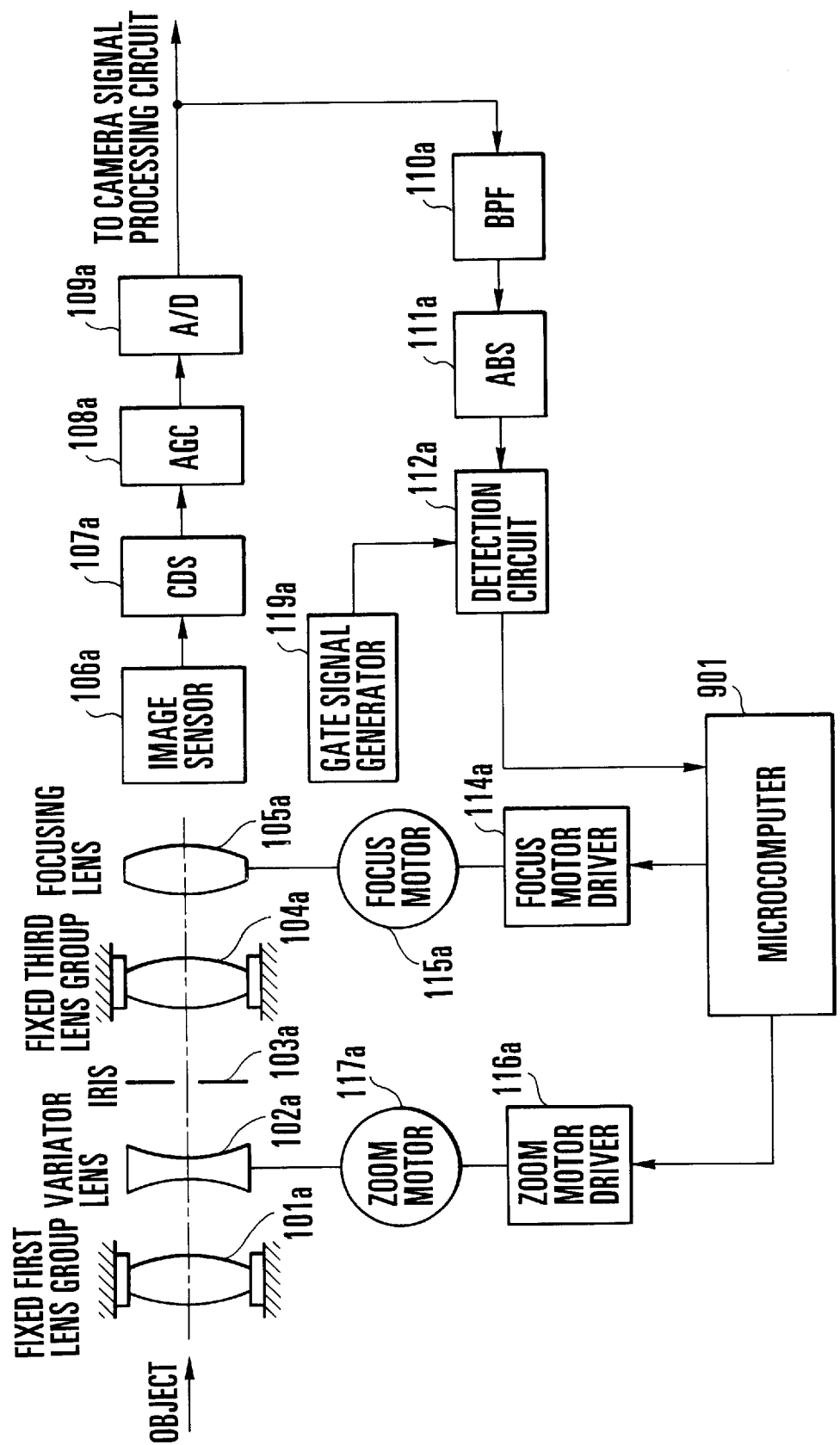
FIG. 1 is a block diagram showing the arrangement of the conventional automatic focus adjusting device.
Figure 2:
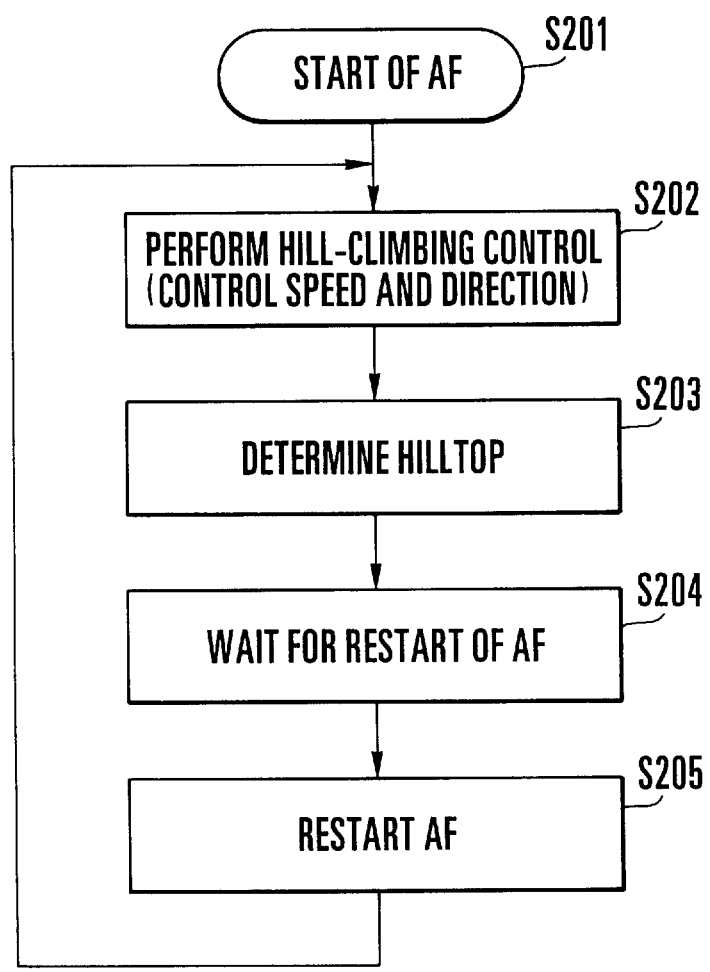
FIG. 2 is a flow chart showing the procedures of an automatic focusing operation taken by a microcomputer included in the arrangement shown in FIG. 1.

The arrangement shown in FIG. 11 differs from the arrangement shown in FIG. 1 in the following points. The object frequency recognizing circuit 118 shown in FIG. 3 is changed to an object frequency recognizing and fluctuation detecting circuit 118'. A processing program of the microcomputer 113 in the third embodiment differs from that in the first embodiment.

The object frequency recognizing and fluctuation detecting circuit 118' is arranged to receive the digital video data from the A/D converter 109 and to supply the results of recognizing and fluctuation-detecting actions to the microcomputer 113.

Figure 12:
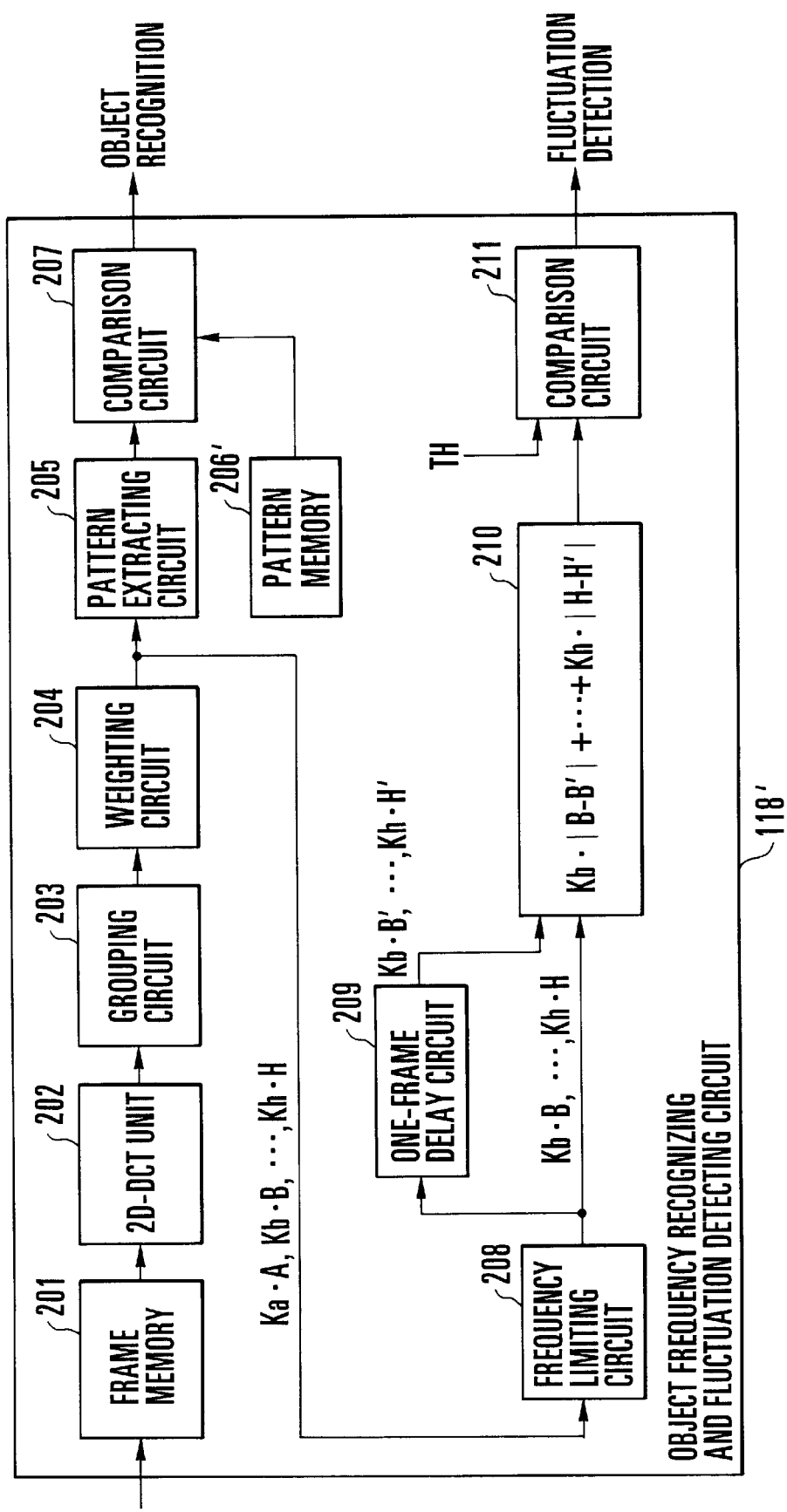
FIG. 12 is a block diagram showing the arrangement of an object frequency recognizing and fluctuation detecting circuit 118' shown in FIG. 11.

FIG. 12 is a block diagram showing the arrangement of the object frequency recognizing and fluctuation detecting circuit 118'. In FIG. 12, parts 201 to 207 are arranged in the same manner as the corresponding parts shown in FIG. 4. The pattern extracting circuit 205 is arranged to extract a pattern indicating changes in level of the weighted values Ka·A to Kh·H and also differences in magnitude of them. The comparison circuit 207 is arranged to compare the extracted pattern with pattern data prestored in the pattern memory 206, so that it is possible to recognize what kind of an object image is represented by the 8×8 picture elements and whether the image is in focus or not. The results of the recognizing action is supplied to the microcomputer 113.

At the same time, the output of the weighting circuit 204 is supplied to a frequency limiting circuit 208. The frequency limiting circuit 208 is arranged to extract only a specific frequency component. In this case, all high-frequency band components Kb·B to Kh·H are extracted, excluding a direct-current component. Then, signals Kb·B' to Kh·H' of the last frame delayed by a one-frame delay circuit 209 and signals Kb·B to Kh·H of the current frame are inputted to an arithmetic circuit 210.

The arithmetic circuit 210 is arranged to obtain a total sum of absolute values of differences of the components (Kb·|B−B'|+- - - +Kh·|H−H'|). The result of this arithmetic operation is supplied to a comparison circuit 211 to be compared with a threshold value TH. If the result of the arithmetic operation is larger than the threshold value TH, the result of the arithmetic operation is considered to indicate large fluctuations and is then supplied to the microcomputer 113 as a result of fluctuation detection.

The picture elements of one frame are divided and the frequency area data is obtained through the two-dimensional DCT action of the two-dimensional DCT unit 202 in the same manner as described in the foregoing with reference to FIGS. 5, 6(a) and 6(b).

Figure 13:
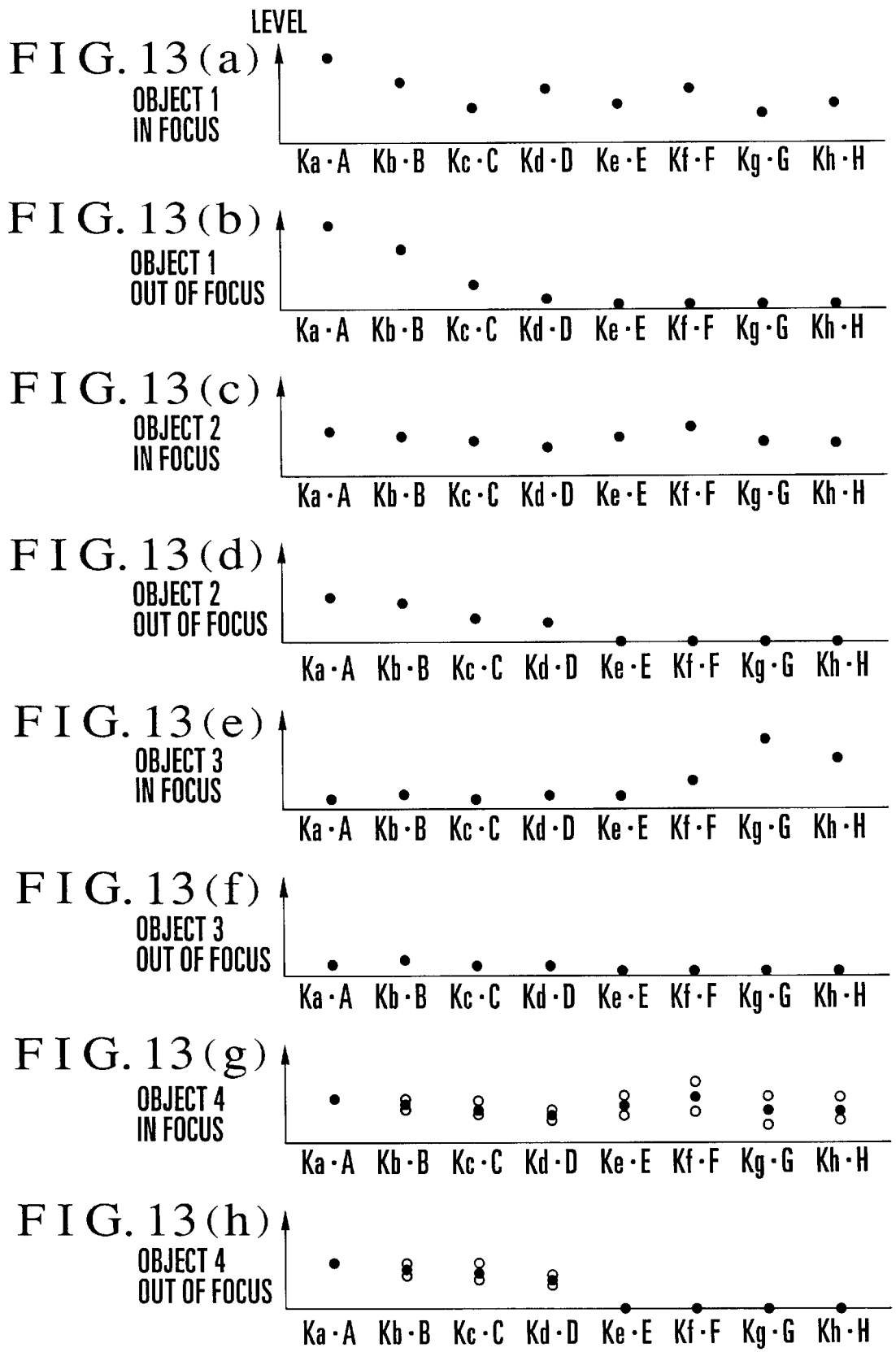
FIGS. 13(a) to 13(h) show pattern data prestored in a pattern memory 206' shown in FIG. 12.

The contents, i.e., patterns in store, of a pattern memory 206' in the third embodiment are expressed as shown in FIGS. 13(a) to 13(h). Of these patterns, the patterns shown in FIGS. 13(a) to 13(f) are identical with those in the first embodiment shown in FIGS. 7(a) to 7(f). In the case of the third embodiment, there are provided additional patterns as shown in FIGS. 13(g) and 13(h).

Although the patterns of FIGS. 13(g) and 13(h) resemble the patterns of FIGS. 13(c) and 13(d) prestored for low-contrast objects in the pattern memory 206' in respect of frequency distribution, they show greater time fluctuations. Referring to FIGS. 13(g) and 13(h), each circle mark "○" indicates the data previously obtained several fields before by shooting one and the same object while each solid circle mark "●" indicates the current data. Each of the patterns shown in FIGS. 13(g) and 13(h) clearly shows a difference between the circle and solid-circle marks. The frequency area data showing such conspicuous fluctuations with time, i.e., many noise components, indicates a low-illuminance object instead of a low-contrast object.

Figure 14:
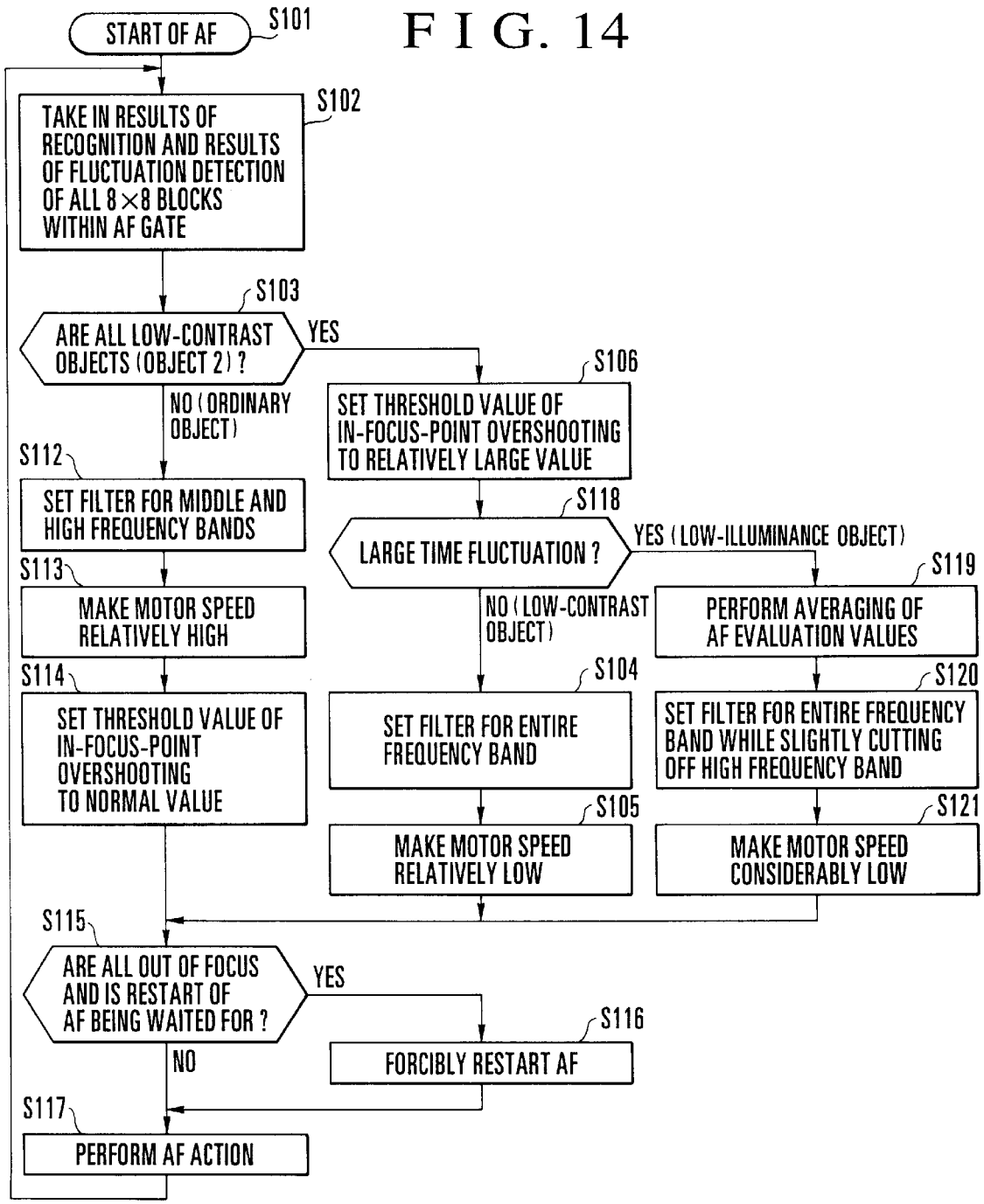
FIG. 14 is a flow chart showing the procedures of focus adjustment to be taken by a microcomputer 113 shown in FIG. 11 on the basis of the results of object frequency recognizing and fluctuation detecting actions.

Fig. 14 is a flow chart showing procedures for a focus adjusting operation taken by the microcomputer 113 on the basis of the results of the object frequency recognizing action and those of the fluctuation detecting action. At a step S101, the flow of operation begins with an initializing action when a power supply is switched on or when the AF function is turned on. At a step S102, the results of the recognizing action on the frequencies and the results of the fluctuation detecting action of all the blocks of 8×8 picture elements within the focus detecting area (AF gate) are completely taken in the memory included in the microcomputer 113. At a step S103, the results of the recognizing action taken in are checked to find if all the results indicate low-contrast objects (object 2) irrespective of their states of focus. If not, the flow of operation proceeds to a step S112.

At the step S112, the characteristic of the BPF 110 is set for middle and high frequency bands. At a step S113, the speed of the motor is set at a relatively high speed. At a step S114, the threshold value of overshooting an in-focus point is set to a normal value.

If it is found at the step S103 that all the results of the recognizing action indicate low-contrast objects, on the other hand, the flow proceeds to a step S106. At the step S106, the threshold value of overshooting an in-focus point is set at a relatively large value. At a step S118, a check is made to find if the result of detection indicates large fluctuations. If not, the flow proceeds to a step S104. At the step S104, since the results of fluctuation detection are small to suggest a low-contrast object, the characteristic of the BPF 110 is set for an entire frequency band. At a step S105, the motor speed is set at a relatively slow speed.

If the result of fluctuation detection is found at the step 118 to be at a large value, thus suggesting a low-illuminance object, instead of a low-contrast object, the flow proceeds to a step S119. At the step S119, AF evaluation values are averaged for setting a value most apposite to a low-illuminance object by removing noise components. At a step S120, the filter is set at a frequency band which is obtained by cutting a high-frequency band from the entire frequency band. At a step S121, the motor speed is set at a low speed in such a way as to ensure that the AF action can be adequately carried out by the hill-climbing control method even with the averaged AF evaluation value.

At a step S115, the results of the recognizing action taken in are checked to find if all data indicate an out-of-focus state and that the AF action is in a state of waiting for a restart. If so, the flow proceeds to a step S116, because this state might have resulted from an erroneous suspension of the AF (automatic focusing) action while the position of the focusing lens is still out of focus. At the step S116, the AF action is forcibly restarted.

At a step S117, the AF action is performed in a normal manner under the hill-climbing control. The flow then returns to the step S102 to repeat above-stated steps in a loop. The loop is executed in synchronism with a period which is an integer times as long as the period of a vertical synchronizing signal.

The above-stated process of averaging the AF evaluation values is as follows. Assuming that an AF evaluation value of a predetermined field "n" or frame "n" is expressed as Vn, an AF evaluation value obtained m fields or m frames before is expressed as Vn−m, and an average AF evaluation value of the field "n" is expressed as Van, the AF evaluation values can be averaged in accordance with the following formula (1):

$$Van = (Vn+Vn-1+Vn-2)/3 \qquad (1).$$

In a case where the amount of signal fluctuations is large, the noise can be removed to a greater extent in accordance with the following formula (2) which uses past information to a larger amount:

$$Van=(Vn+Vn-1+Vn-2+Vn-3)/4 \qquad (2).$$

The averaging action also may be accomplished by carrying out an arithmetic operation for every field or every frame in accordance with the following formula (3):

$$Van=K \cdot Vn+(1-K) \cdot Van-1 \text{ wherein } 0<K<1 \qquad (3).$$

The third embodiment is arranged to carry out the object frequency recognizing action only within the focus detecting area. This arrangement may be changed to carry out the object frequency recognizing action for the whole area of the frame or in units of a block which is either larger or smaller than the 8×8 picture element block. Further, the grouping circuit 203 is arranged to use the largest value of each group as a representative value. That arrangement may be changed to use a sum of values obtained within each group as the representative value.

The performance of the automatic focus adjusting device can be enhanced by increasing the amount of the object pattern data prestored and by increasing the number of conditional branching parts accordingly within the microcomputer 113.

The object frequency recognizing and fluctuation detecting circuit 118' is arranged to recognize the object frequencies after image data for one frame is stored by the frame memory 201. However, since the automatic focus adjustment must be carried out at a high speed, the object frequency recognizing and fluctuation detecting circuit 118' may be arranged, in the case of an interlaced-scanning type camera, to store just image data for one field at a field memory and to perform the object frequency recognizing action on a field image thus obtained.

(Fourth Embodiment)

An automatic focus adjusting device arranged as a fourth embodiment of the invention is described. The fourth embodiment are arranged in the same manner as the third embodiment except that the arrangement of the object frequency recognizing and fluctuation detecting circuit differs from that of the third embodiment. The details of other component parts are, therefore, omitted from the following description.

Figure 15:
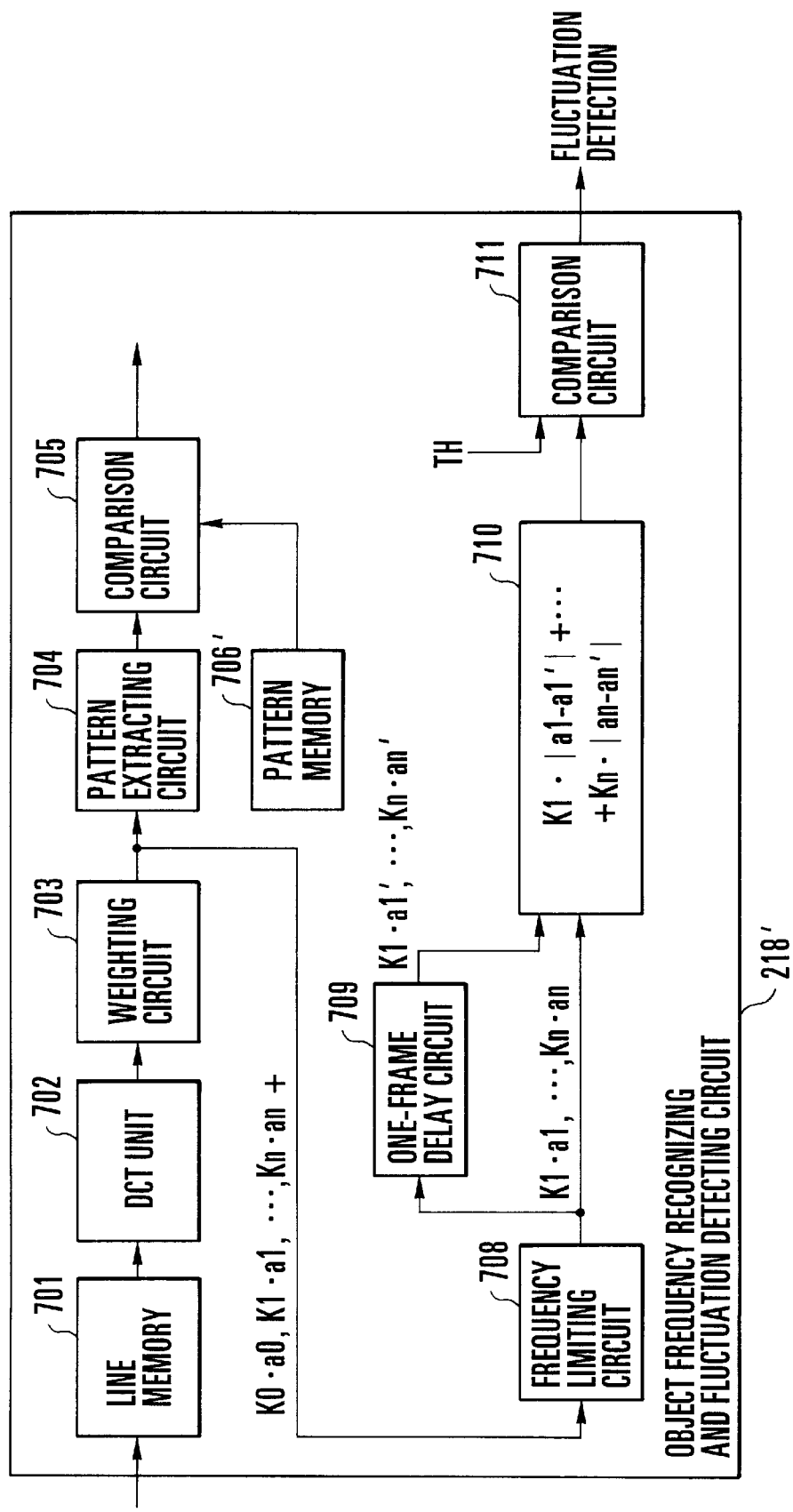
FIG. 15 is a block diagram showing the arrangement of an object frequency recognizing and fluctuation detecting circuit in an automatic focus adjusting device according to a fourth embodiment of the invention.

FIG. 15 is a block diagram showing the arrangement of the object frequency recognizing and fluctuation detecting circuit 218' in the fourth embodiment. The object frequency recognizing and fluctuation detecting circuit 218' is composed of a line memory 701, a DCT unit 702, a weighting circuit 703, a pattern extracting circuit 704, a pattern memory 706', a comparison circuit 705, a frequency limiting circuit 708, a one-frame delay circuit 709, an arithmetic circuit 710 and a comparison circuit 711.

The block arrangement of the fourth embodiment is the same as that of the third embodiment. In the case of the fourth embodiment, however, the object frequency recognizing and fluctuation detecting actions are performed for every horizontal line instead of every square block of 8×8 picture elements. The arrangement of data in the horizontal line direction is the same as that shown in FIG. 10.

In the fourth embodiment, the object frequency recognizing and fluctuation detecting circuit 218' is arranged to use the data 802 aligned in the direction of one-dimensional horizontal line. The object frequency recognizing and fluctuation detecting circuit 218' can be arranged at a low cost by virtue of this arrangement. The digital video data is stored in the line memory 701 in units of one line. Among the data in store, the data of picture elements in the focus detecting area is serially transformed by the DCT action of the DCT unit 702 into frequency area data (a0 to an).

The weighting circuit 703 attaches weight to each of the converted data in such a way as to optimize it by multiplying it by one of coefficients K0 to Kn. The weighting coefficients are set at such values that the levels of data of the entire frequency band become about the same when a signal in which frequencies are uniformly distributed from a low-frequency band through a high-frequency band is inputted.

The pattern extracting circuit 704 is arranged to extract patterns indicating changes in level of the weighted data values K0·a0 to Kn·an and indicating differences in size of them. The comparison circuit 705 is arranged to compare the patterns extracted with pattern data prestored in the pattern memory 706'. The results of the comparison show what kind of an object image is obtained and whether the image is in focus or not. The results of the recognizing action are supplied to the microcomputer 113.

At the same time, the output of the weighting circuit 703 is supplied to the frequency limiting circuit 708. The frequency limiting circuit 708 is arranged to extract only a specific frequency component. In this case, all high-frequency band components K1·a1 to Kn·an are extracted, excluding a DC component. Then, signals K1·a1 ' to Kn·an' of a last frame delayed by the one-frame delay circuit 709 and current signals K1·a1 to Kn·an are inputted to the arithmetic circuit 710. The arithmetic circuit 710 is arranged to obtain a total sum of absolute values of differences of the components (K1·|a1−a1'|+ - - +Kn·|an −an'|).

The result of this arithmetic operation is supplied to the comparison circuit 711 to be compared with a threshold value TH. If the result of the arithmetic operation is larger than the threshold value TH, the result of the arithmetic operation is considered to indicate large fluctuations and is then supplied to the microcomputer 113 as a result of fluctuation detection. The microcomputer 113 then controls the automatic focusing action according to the same algorithm as in the case of the third embodiment.

The third and fourth embodiments are arranged to use the DCT method for transforming the digital video data into frequency areas. However, the DCT method may be replaced with a discrete Fourier transform (DFT) method or a fast Fourier transform (FFT) method.

The invention is applicable either to a system consisting of a plurality of apparatuses or to a system consisting of a single apparatus. The invention is also applicable to a case where automatic focus adjustment can be accomplished by supplying a program to a system or an apparatus. In that case, the advantageous effect of the invention can be attained by storing a program expressed in software in a storage medium and by reading the program from the storage medium for the system or the apparatus.

For adjusting a focused state of an image picked up by image pickup means by extracting as a focus signal a high-frequency component in a focus detecting area within the image pickup plane of the image pickup means and by driving a focusing lens on the basis of the focus signal extracted, the embodiment is arranged as described above to transform a two-dimensional object image picked up by the image pickup means into frequency components by two-dimensional transforming means, to find by determining means if the amount of time fluctuations of each of the frequency components is larger than a predetermined value, and to vary by varying means the characteristic of the extracting means and that of the driving means on the basis of the result of determination made by the determining means. Therefore, an automatic focusing action can be accomplished by determining shooting conditions on the basis of the focus signal obtaining by extracting the high-frequency component in the focus detecting area and the fluctuations with time of the frequency components of the object image detected. The arrangement of the embodiment described effectively lessens such objects of shooting that have been very difficult for automatic focus adjustment, particularly because of a low luminance or insufficient contrast. Therefore, the focusing action can be stably carried out without being misled by the state of the object or shooting conditions.

Further, according to the arrangement of the embodiments provided with the averaging means for averaging the focus signal, the varying means is arranged to vary the characteristic of the averaging means, so that an automatic focus adjusting action can be stably performed irrespective of the state of the object and the shooting conditions.

Further, according to the arrangement of the embodiment described, a high-frequency component in the focus detecting area within the image pickup plane of the image pickup means is extracted as a focus signal, in adjusting the focused state of an image picked up by the image pickup means by driving the focusing lens with the driving means on the basis of the extracted focus signal, the object image picked up by the image pickup means is transformed into frequency components for every line by the transforming means, the magnitude of time fluctuations of each of the frequency components is examined by determining means to find if it is larger than a predetermined value, the characteristic of the extracting means and that of the driving means are varied by varying means on the basis of the result of determination made by the determining means. Therefore, with the image processed for every horizontal line, the circuits of the embodiment can be arranged at a low cost.

Further, the above-stated transforming means is provided with line memory means for temporarily storing a one-dimensional image and orthogonal transforming means for orthogonally transforming the one-dimensional image into frequency components. The provision of the transforming means thus simplifies the processes.

I claim:

1. An automatic focus adjusting device arranged to adjust, by driving a focusing lens, focus of an image picked up by image pickup means, said automatic focus adjusting device comprising:

extracting means for extracting, as a focus signal, a high-frequency component in a focus detecting area within an image plane of the image picked up by said image pickup means;

object frequency recognizing means for recognizing, from a frequency distribution of an object whose image is picked up by said image pickup means, a feature of the object; and driving means for driving the focusing lens on the basis of the focus signal extracted by said extracting means and the feature of the object recognized by said object frequency recognizing means.

2. An automatic focus adjusting device, comprising:

extracting means for extracting, as a focus signal, a high-frequency component in a focus detecting area within an image plane of an image picked up by image pickup means;

driving means for driving a focusing lens on the basis of the extracted focus signal so as to adjust focus of the image picked up by said image pickup means;

two-dimensional transforming means for transforming into frequency components a two-dimensional image of an object whose image is picked up by said image pickup means;

recognizing means for recognizing a feature of the object by comparing a magnitude of each of the frequency components with a predetermined value; and varying means for varying characteristics of said extracting means and said driving means on the basis of a result of recognition provided by said recognizing means.

3. An automatic focus adjusting device according to claim 2, wherein said two-dimensional transforming means comprises:

storing means for temporarily storing the two-dimensional image;

two-dimensional orthogonal transforming means for orthogonally transforming the two-dimensional image stored in said storing means; and grouping means for grouping by frequency bands the frequency components obtained by said two-dimensional orthogonal transforming means.

4. An automatic focus adjusting device according to claim 3, wherein said two-dimensional orthogonal transforming means is arranged to perform a two-dimensional discrete cosine transform.

5. An automatic focus adjusting device according to claim 3, wherein said two-dimensional orthogonal transforming means is arranged to divide the two-dimensional image into picture element blocks each of which is composed of eight picture elements in a horizontal direction multiplied by eight picture elements in a vertical direction, and to perform a two-dimensional discrete cosine transform on every one of the divided picture element blocks.

6. An automatic focus adjusting device according to claim 2, wherein said varying means is arranged to vary a frequency characteristic of said extracting means.

7. An automatic focus adjusting device according to claim 2, wherein said varying means is arranged to vary a driving speed of said driving means.

8. An automatic focus adjusting device according to claim 2, wherein said varying means is arranged to vary a threshold value of overshooting to be made in detecting an in-focus point.

9. An automatic focus adjusting device according to claim 2, wherein said varying means is arranged to vary a threshold value to be used in detecting a restart of focus adjustment.

10. An automatic focus adjusting device, comprising:

extracting means for extracting, as a focus signal, a high-frequency component in a focus detecting area within an image plane of an image picked up by image pickup means;

driving means for driving a focusing lens on the basis of the extracted focus signal so as to adjust focus of the image picked up by said image pickup means;

transforming means for transforming an image of an object picked up by said image pickup means into frequency components for every line of the image;

recognizing means for recognizing a feature of the object by comparing a magnitude of each of the frequency components with a predetermined value; and varying means for varying characteristics of said extracting means and said driving means on the basis of a result of recognition provided by said recognizing means.

11. An automatic focus adjusting method for adjusting, by driving a focusing lens, focus of an image picked up by an image pickup apparatus, comprising:

an extracting step of extracting, as a focus signal, a high-frequency component in a focus detecting area within an image plane of the image picked up by said image pickup apparatus;

an object frequency recognizing step of recognizing, from a frequency distribution of an object whose image is picked up by said image pickup apparatus, a feature of the object; and a driving step of driving the focusing lens on the basis of the extracted focus signal and the recognized feature.

12. An automatic focus adjusting device, comprising:

extracting means for extracting, as a focus signal, a high-frequency component in a focus detecting area within an image plane of an image picked up by image pickup means;

driving means for driving a focusing lens on the basis of the extracted focus signal so as to adjust focus of the image picked up by said image pickup means;

two-dimensional transforming means for transforming into frequency components a two-dimensional image of an object whose image is picked up by said image pickup means;

determining means for determining whether a magnitude of time fluctuation of each of the frequency components is greater than a predetermined value; and varying means for varying characteristics of said extracting means and said driving means on the basis of a result of determination provided by said determining means.

13. An automatic focus adjusting device according to claim 12, wherein said two-dimensional transforming means comprises:

storing means for temporarily storing the two-dimensional image;

two-dimensional orthogonal transforming means for orthogonally transforming the two-dimensional image stored in said storing means; and grouping means for grouping by frequency bands the frequency components obtained by said two-dimensional orthogonal transforming means.

14. An automatic focus adjusting device according to claim 13, wherein said two-dimensional orthogonal transforming means is arranged to perform a two-dimensional discrete cosine transform.

15. An automatic focus adjusting device according to claim 13, wherein said two-dimensional orthogonal transforming means is arranged to divide the two-dimensional image into picture element blocks each of which is composed of eight picture elements in a horizontal direction multiplied by eight picture elements in a vertical direction, and to perform a two-dimensional discrete cosine transform on every one of the divided picture element blocks.

16. An automatic focus adjusting device according to claim 12, wherein said varying means is arranged to vary a frequency characteristic of said extracting means.

17. A device according to claim 12, wherein said varying means is arranged to vary a driving speed of said driving means.

18. An automatic focus adjusting device according to claim 12, further comprising averaging means for averaging the focus signal extracted by said extracting means, and wherein said varying means is arranged to vary a characteristic of said averaging means.

19. An automatic focus adjusting device, comprising:

extracting means for extracting, as a focus signal, a high-frequency component in a focus detecting area within an image plane of an image picked up by image pickup means;

driving means for driving a focusing lens on the basis of the extracted focus signal so as to adjust focus of the image picked up by said image pickup means;

transforming means for transforming an image of an object picked up by said image pickup means into frequency components for every line of the image;

determining means for determining whether a magnitude of time fluctuation of each of the frequency components is greater than a predetermined value; and varying means for varying characteristics of said extracting means and said driving means on the basis of a result of determination provided by said determining means.

20. An automatic focus adjusting device according to claim 19, wherein said transforming means comprises:

line memory means for temporarily storing a one-dimensional image; and orthogonal transforming means for orthogonally transforming the one-dimensional image stored in said line memory means.

21. An automatic focus adjusting device according to claim 20, wherein said orthogonal transforming means is arranged to perform a discrete cosine transform.

22. An automatic focus adjusting device according to claim 19, wherein said varying means is arranged to vary a frequency characteristic of said extracting means.

23. An automatic focus adjusting device according to claim 19, wherein said varying means is arranged to vary a driving speed of said driving means.

24. An automatic focus adjusting device according to claim 19, further comprising averaging means for averaging the focus signal extracted by said extracting means, and wherein said varying means is arranged to vary a characteristic of said averaging means.

25. An automatic focus adjusting method, comprising:

an extracting step of extracting, as a focus signal, a high-frequency component in a focus detecting area within an image plane of an image picked up by an image pickup apparatus;

a driving step of driving a focusing lens on the basis of the extracted focus signal so as to adjust focus of the image picked up by said image pickup apparatus;

a two-dimensional transforming step of transforming into frequency components a two-dimensional image of an object whose image is picked up by said image pickup apparatus;

a determining step of determining whether a magnitude of time fluctuation of each of the frequency components is greater than a predetermined value; and a varying step of varying an extracting characteristic of said extracting step and a driving characteristic of said driving step on the basis of a result of determination provided by said determining step.

* * * * *

UNITED STATES PATENT AND TRADEMARK OFFICE
CERTIFICATE OF CORRECTION

PATENT NO. : 5,842,059
DATED : November 24, 1998
INVENTOR(S) : Hirofumi Suda

It is certified that error appears in the above-identified patent and that said Letters Patent is hereby corrected as shown below:

Col. 6, line 20, delete "are" and insert --is--.
Col. 6, line 38, delete "is" and insert --are--.
Col. 6, line 53, after "ponents" insert --are present--.
Col. 6, line 56, delete "is" and insert --are--.
Col. 8, line 48, delete "K'" and insert --K'a--.
Col. 11, line 13, delete "is" and insert --are--.

Signed and Sealed this

Third Day of August, 1999

Attest:

Q. TODD DICKINSON

*Attesting Officer*          *Acting Commissioner of Patents and Trademarks*